United States Patent [19]
Sauer et al.

[11] Patent Number: 5,602,373
[45] Date of Patent: Feb. 11, 1997

[54] DIFFERENTIAL PRESSURE SWITCH WITH AN ADJUSTING PISTON DRIVEN BY A RESTORING SPRING FOR AN OIL-SEPARATING AIR FILTER

[75] Inventors: Bernd Sauer, Obersulm; Michael Wolf, Gaeufelden, both of Germany

[73] Assignee: Filterwerk Mann & Hummel GmbH, Ludwigsburg, Germany

[21] Appl. No.: 417,862

[22] Filed: Apr. 6, 1995

[30] Foreign Application Priority Data

Apr. 6, 1994 [DE] Germany .............. 9405685 U

[51] Int. Cl.⁶ .................................................. H01H 35/34
[52] U.S. Cl. .......................... 200/82 E; 73/745; 116/267; 200/83 J; 340/607
[58] Field of Search ........................ 307/118; 340/607, 340/611, 626; 73/715, 717, 722, 723, 728, 745; 116/220, 266, 267, 268; 200/51 R, 82 R, 82 E, 83 R, 83 A, 83 J, 83 L

[56] References Cited

U.S. PATENT DOCUMENTS

| | | | |
|---|---|---|---|
| 3,206,572 | 9/1965 | Buehler | 200/83 L |
| 4,168,415 | 9/1979 | Edwards, Jr. et al. | 200/308 |
| 4,343,974 | 8/1982 | Hire | 200/243 |
| 4,368,366 | 1/1983 | Kitamura | 200/83 Q |
| 4,525,611 | 6/1985 | Akamatsu | 200/83 R |
| 4,792,651 | 12/1988 | Whiting | 200/82 E |
| 4,879,439 | 11/1989 | Garcia | 200/81.9 M |
| 5,089,675 | 2/1992 | Betterton | 200/83 J |

Primary Examiner—Gerald P. Tolin
Attorney, Agent, or Firm—Evenson, McKeown, Edwards & Lenahan P.L.L.C.

[57] ABSTRACT

A differential pressure switch particularly suitable for monitoring dirt accumulation on a filter element of an oil-separating air filter comprising a piston which is movable in response to a relative change in pressure between two pressure zones and is biased in one direction by a restoring spring, and a rolling membrane which separates the pressure zones.

13 Claims, 3 Drawing Sheets

DIFFERENTIAL PRESSURE SWITCH WITH AN ADJUSTING PISTON DRIVEN BY A RESTORING SPRING FOR AN OIL-SEPARATING AIR FILTER

BACKGROUND OF THE INVENTION

The wide range of applications in the pressure measurement field has led to the development of many different types of pressure sensors which utilize a variety of physical sensing principles (mechanical, inductive, capacitive, etc.) and embody a large number of constructive solutions.

Pressure is defined as force per surface by means of the unit 1 bar=1*10N/m=1*10 pascal. The zero point of a pressure scale is either the pressure of an absolute vacuum or atmospheric pressure.

A distinction is therefore made between the absolute pressure: a vacuum (0 bar) is the reference point;

overpressure/underpressure: atmospheric pressure of approximately 1 bar is the reference point, and 5 bar overpressure therefore corresponds to an absolute pressure of approximately 6 bar.

differential pressure: indicated by the difference between two pressures measured in the same reference system.

Accordingly, pressure sensors can be divided into absolute-pressure sensors, overpressure/underpressure sensors and differential-pressure sensors. Differential pressure sensors measure the difference of the pressures sensed in two separate chambers.

In absolute-pressure sensors one of the two chambers is evacuated so that the measured pressure corresponds to the absolute pressure.

Overpressure and underpressure sensors require only one pressure chamber since the comparison takes place with respect to the external atmospheric pressure. Sensors of this type can therefore be implemented more easily than the other two types of sensors.

Because of the vacuum chamber, absolute pressure sensors are very costly to manufacture.

In addition to being a function of the type of sensing, the cost of producing a pressure sensor also depends on the precision, the measuring tolerance and the magnitude of the pressure to be measured.

Because they are simpler to produce, there are numerous overpressure and underpressure sensors. They are used where the measurement can be made with reference to the atmosphere, as, for example, for determining the degree of contamination of air and oil filters in vehicles.

In course of use, filters will become increasingly dirty. This results in an increase of the pressure drop between the dirty side (in front of the element) and the clean side (behind the element). When the pressure drop becomes too large, the filter element has to be replaced.

On the other hand, it can be quite difficult to determine the pressure drop of filter elements in hydraulic and pneumatic systems. Since, depending on the system, different operating pressures will exist here, the measurement cannot be made with reference to the atmosphere; instead the differential pressure must be sensed. The high operating pressures present another difficulty. This is because the high operating pressures make it very difficult to establish a connection from the pressure chambers to the outside.

There are basically three types of filter maintenance transducers or sensors:

1. Maintenance indicator (optical)
2. Maintenance switch (electric)
3. Combination maintenance switch/indicator.

Depending on the type of switching, the switches are divided into break contact switches, make contact switches and change-over contact switches.

Switch arrangements comprising a piston and a restoring spring are known. However, because the piston must always have a certain play in order to move, such switches are subject to the problem that a short circuit or bypass may occur around the piston. The medium can therefore circumvent the filter element and pass directly from the dirty side to the clean side.

In a hydraulic system, this is not so critical. In systems in which super-clean air is to be produced by means of an oil-separating air filter, this may drastically impair the efficiency of the filter.

In order to permit movement while maintaining a simultaneous seal, pistons are therefore frequently used in conjunction with membranes.

However, the conventional membranes usually allow only small strokes. Therefore, rubber bellows were frequently used for sealing which, however, cause an undefinable power shift of the pressure, which makes it difficult to achieve reproducible pressure sensing.

In oil-separating air cleaner elements, it is also insufficient to use a piston in combination with O-rings as a moving seal.

In contrast, a rolling membrane, as a special form of membrane, permits a relatively large stroke with a reproducible stroke movement and a minimum housing diameter.

SUMMARY OF THE INVENTION

It is therefore an object of the invention to provide an improved differential pressure switch and/or indicator with an adjusting cylinder driven by a restoring spring.

It is also an object of the invention to provide a differential pressure switch and/or indicator which has a modular construction.

Another object of the invention is to provide a differential pressure switch and/or indicator which can be readily assembled.

A further object of the invention is to provide a differential pressure switch and/or indicator which is reasonable in cost.

An additional object of the invention is to provide a differential pressure switch and/or indicator which can withstand high pressures.

Yet another object of the invention is to provide a differential pressure switch and/or indicator which has relatively small dimensions.

These and other objects of the invention are achieved by providing a differential pressure indicator comprising a piston exposed to pressures of two different pressure zones, wherein said piston is movable in response to a relative change in pressure between said two pressure zones and is biased in one direction by a restoring spring, and wherein said different pressure zones are separated by a rolling membrane.

In accordance with the invention, particularly in the case of oil-separating air cleaner elements, the different pressure zones are separated by means of a rolling membrane. This is accomplished by providing a differential pressure indicator wherein one pressure zone is in communication with an unfiltered air zone on one side of an oil separating air filter element and the other pressure zone is in communication with a filtered air zone on the other side of the oil separating air filter element, whereby the indicator indicates the pressure difference between the unfiltered air zone and the filtered air zone.

Advantageous preferred embodiments are described hereinafter. These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

All three possible types of maintenance sensors were developed as modular plug-in type or snap-mount type devices. This means that all three types have the same basic modular structure.

Figure 2:
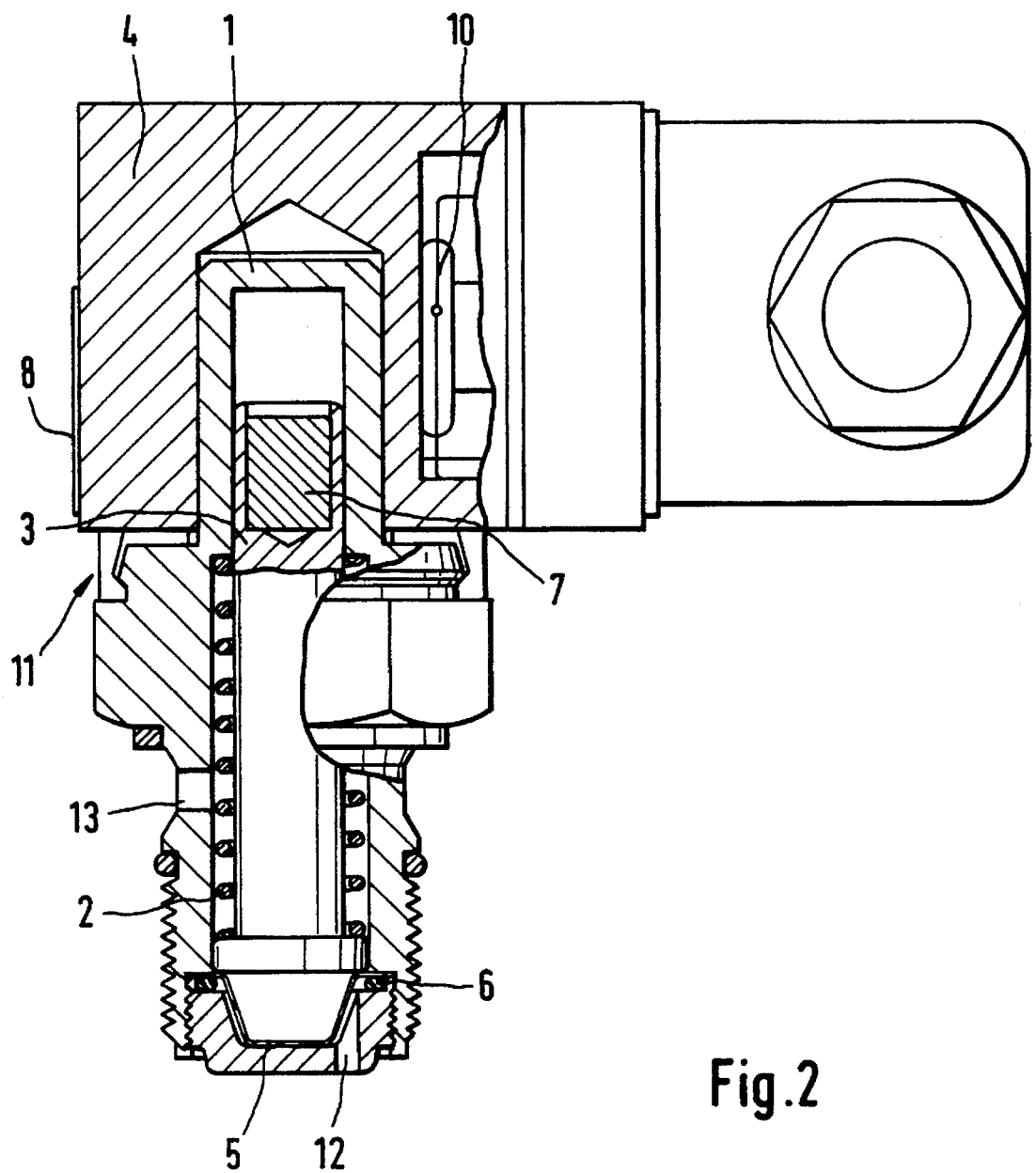
FIG. 2 is a view of a maintenance switch.
Figure 3:
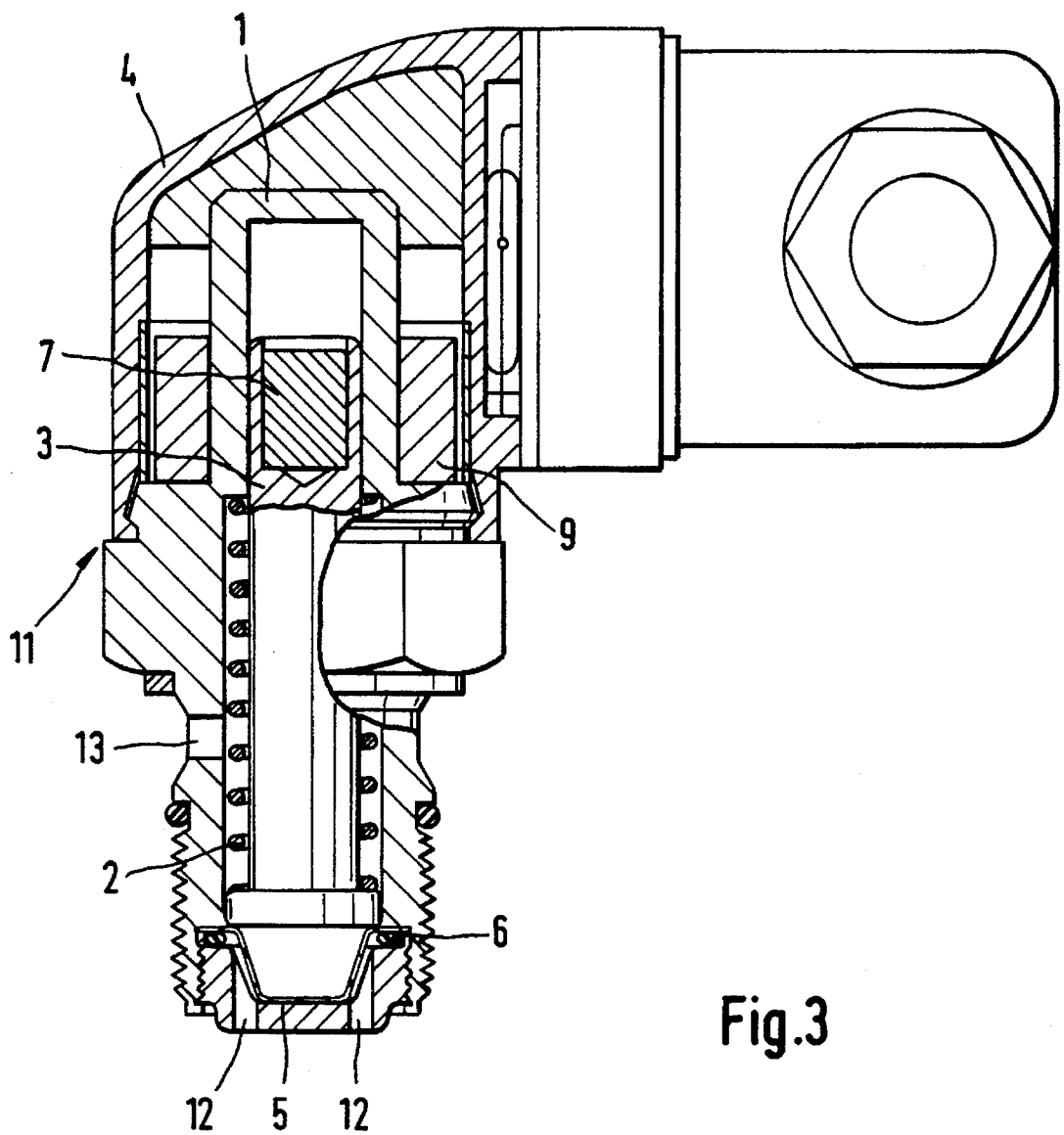
FIG. 3 is a view of an indicator switch.

In the indicator embodiment, shown in FIG. 2 a switching and/or indicating part or module 4 with a transparent indicating area 8 and a pressure scale is snapped onto the basic body or cylinder housing or sensor module 1 of the adjusting piston by way of snap connection 11. In the switch embodiment shown in FIG. 2, a switch housing or module 4 is snapped onto the cylinder housing or sensor module of the adjusting piston by way of snap connection 11. In the switch/indicator embodiment shown in FIG. 3, a switching and indicating part or module 4 with a transparent indicating area 8 and a pressure scale and an integrated switch is snapped onto the cylinder housing or sensor module 1 by way of snap connection 11.

The differential pressure acts upon a rolling membrane with a piston. A restoring spring 2, which is integrated into the housing, serves as a restoring force or counterforce. A very small rolling membrane 5 is integrated in the cap screw (M 18×1.5). In addition, this rolling membrane 5 is reinforced by woven fabric, and as a result the device is able to withstand differential pressures of up to 8 bar.

As a rule, rolling membranes 5 are provided with an injection-molded reinforcing rib. However, this is not possible in the case of this small rolling membrane because it has a thickness of only 0.18 mm. In this process, the membrane is deep-drawn from membrane material and stamped out. The rolling membrane 5 is mounted in a force-locking manner and is clamped tightly in place by means of an interposed O-ring 6. The rolling membrane 5 is inserted in a bushing with the O-ring. The cylinder housing 1 of the adjusting piston is preferably provided with two bores 12 for tapping or sensing the pressure of the dirty side. The interior form is conical in shape corresponding to the angle of the rolling membrane 5 and of the end of the adjusting piston. This assures an optimal rolling motion and simultaneously serves as a guide for the piston/membrane system during assembly.

The arrangement of the bushing/O-ring/membrane/piston/piston guide in the cap screw is such that, when the pressure increases, the sealing effect is increased by the deformation of the O-ring in the sealing gap. In addition, the housing diameter on which the rolling membrane unrolls always remains the same.

The basic component is assembled as follows: First, the bar magnet 7 is fixed in the piston 3 by gluing/crimping it in place. The O-ring 6 is pressed into the bushing, and the rolling membrane 5 is inserted into the bushing. The pressure spring 2 is placed over the adjusting piston 3. The adjusting piston 3 with the restoring spring 2 is now fitted with its conical bottom end in the conical membrane/bush opening and introduced into the cap screw closure thread. The bushing is pressed against a stop and is optionally secured in place against the cap screw by crimping a flanged lower edge.

So that no bypass can occur through the thread of the cap screw, an O-ring 6 is mounted in a recess of the cap screw. An aluminum sealing ring is pushed over the thread. The O-ring is mounted on the thread recess of the locking screw by means of a mounting mandrel.

Figure 1:
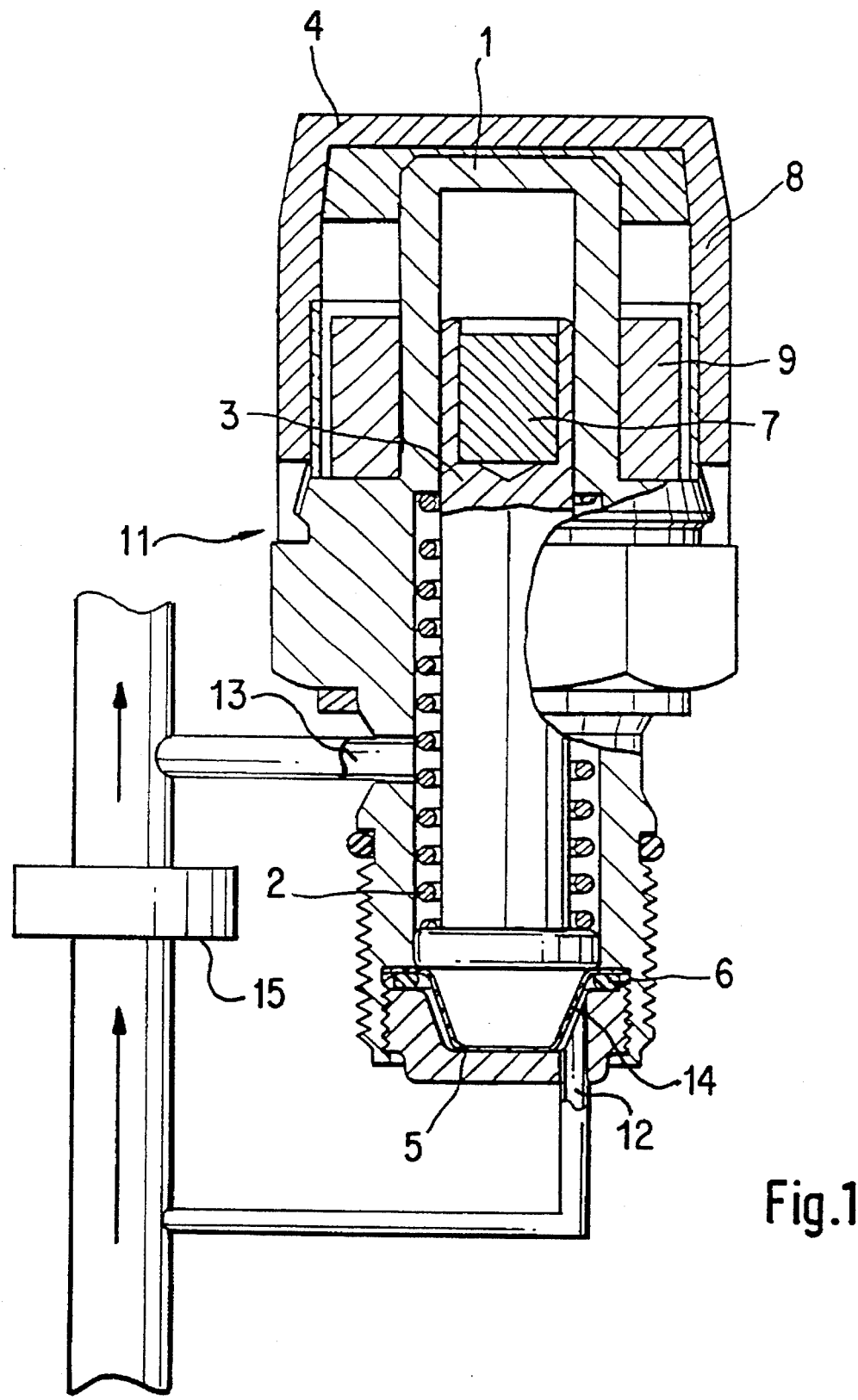
FIG. 1 is a view of a maintenance indicator.

In the maintenance indicator embodiment shown in FIG. 1, the annular magnet 9 is fitted in place and a switching and/or indicating part 4 with a transparent indicating area 8 is snapped on. In the maintenance indicator, the annular magnet 9 is used as an indicator element and, in the switch/indicator the magnet is used simultaneously as a switching magnet.

In the switch embodiment shown in FIG. 2, the magnetic region 7 of the adjusting piston directly switches on the reed contact 10. The reed contact 10 is bent, glued into the switch housing and connected to a plug connector with a socket (Protective System IP 65). A change-over reed contact is used which can carry out all types of switching (break contacts, make contacts and change-over contacts). Optionally, a pure make contact variant may be used with the same mounting measurements which saves mounting, fabricating and purchasing costs in comparison to a change-over contact.

The pressure tap or pressure sensing on the clean side (lower pressure) behind the filter element 15 occurs through a bore 13 located between the recess for receiving the snap connector detent and the mounting thread for receiving the cap screw.

The reinforcement or amplification of the clamping force of the membrane when the pressure increases, takes place by means of the clamping system/arrangement.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A differential pressure indicator for use in a system including an oil separating air filter element which separates an unfiltered air zone from a filtered air zone and which filters a mixture of air and oil, comprising a housing, a piston arranged in said housing and exposed to pressures of two different pressure zones, one of said pressure zones being in communication with said unfiltered air zone, and the other of said pressure zones being in communication with said filtered air zone, and a rolling member arranged in said housing adjacent one end of said piston, wherein said piston is movable in response to a relative change in pressure between said two pressure zones and is biased in one direction by a restoring spring, and wherein said different pressure zones are separated by said rolling membrane.

2. A differential pressure indicator according to claim 1, wherein the indicator comprises a switch.

3. A differential pressure indicator according to claim 1, wherein the rolling membrane is reinforced by fabric.

4. A differential pressure indicator according to claim 1, wherein the rolling membrane is mounted in a force-locking manner.

5. A differential pressure indicator according to claim 4, wherein an O-ring is interposed between the rolling membrane and the housing in order to increase the force locking.

6. A differential pressure indicator according to claim 1, wherein the piston has substantially conical configuration at one end and is housed in a cylinder having said rolling membrane mounted adjacent one end thereof, said one cylinder end having a corresponding substantially conical configuration into which the substantially conical end of the piston is received.

7. A differential pressure indicator according to claim 2, wherein said piston carries a magnetic element which actuates the switch when the piston is moved in response to a predetermined pressure differential between the pressure zones.

8. A differential pressure indicator according to claim 7, wherein the switch comprises an annular magnet through which the magnetic element of the piston is moved when the piston moves in response to a predetermined pressure difference between the pressure zones.

9. A differential pressure indicator according to claim 1, wherein the indicator comprises a transparent cover member through which movement of the piston can be viewed.

10. A differential pressure indicator according to claim 2, wherein the switch comprises a reed contact which is switched by movement of the piston in response to a predetermined pressure difference between the pressure zones.

11. A differential pressure indicator according to claim 1, comprising a sensor module which houses the piston and an indicator module secured to said sensor module by a snap detent connection.

12. A differential pressure indicator according to claim 1, comprising a sensor module which houses the piston and a switch module secured to said sensor module by a snap detent connection.

13. A differential pressure indicator according to claim 1, comprising a sensor module which houses the piston and an indicator switch module secured to said sensor module by a snap detent connection.

* * * * *